United States Patent
Canevini et al.

(10) Patent No.: US 6,520,760 B1
(45) Date of Patent: Feb. 18, 2003

(54) MOULD FOR PRODUCING A TIRE

(75) Inventors: Laura Canevini, Milan (IT); Daniele Lorenzetti, Villasanta (IT); Elda Gelosa, Lissone (IT); Federico Mancosu, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/577,891

(22) Filed: May 25, 2000

Related U.S. Application Data

(60) Provisional application No. 60/136,761, filed on May 28, 1999.

(30) Foreign Application Priority Data

May 27, 1999 (EP) .............................................. 99201677

(51) Int. Cl.$^7$ ............................................... B29C 35/02
(52) U.S. Cl. ......................... 425/28.1; 425/46; 152/454
(58) Field of Search .......................... 425/28.1, 35, 46; 152/454

(56) References Cited

U.S. PATENT DOCUMENTS

| | | | |
|---|---|---|---|
| 4,282,918 A | | 8/1981 | Tomoda et al. |
| 5,027,876 A | | 7/1991 | Chrobak et al. |
| 5,261,474 A | * | 11/1993 | Lobb et al. .................. 152/454 |
| 5,906,693 A | * | 5/1999 | Morii et al. .................. 152/454 |

FOREIGN PATENT DOCUMENTS

| | | |
|---|---|---|
| EP | 0 533 085 | 3/1993 |
| EP | 0 739 759 | 10/1996 |

OTHER PUBLICATIONS

A. Kazuo, "Radial Tire", Patent Abstracts of Japan—JP 08 142602, (1996).
H. Hiroshi, "Pneumatic Radial Tire", Patent Abstracts of Japan—JP 61 132401, (1986).
K. Kazutomi, "Pneumatic Tyre of Vehicle", Patent Abstracts of Japan—JP 60 148702, (1985).

* cited by examiner

Primary Examiner—James P. Mackey
(74) Attorney, Agent, or Firm—Finnegan, Henderson, Farabow, Garrett & Dunner, L.L.P.

(57) ABSTRACT

A mould for producing a tire includes a crown and at least two cheeks. The crown includes radially-movable sectors. A first cheek is axially opposite a second cheek. The mould includes a main profile in a plane of a meridian section. The main profile includes a maximum chord, a maximum height measured from a fitting line, a profile of the first and second cheeks, and a base profile of a sector. The base profile includes first and second lateral portions, first and second connecting portions, and a central portion. The first lateral and connecting portions are axially opposite the second lateral and connecting portions. Each cheek profile includes first and second portions including first and second radii of curvature, where a ratio of the first radius of curvature to the second radius of curvature is greater than or equal to 0.45:1 and less than or equal to 0.56:1.

27 Claims, 7 Drawing Sheets

MOULD FOR PRODUCING A TIRE

CROSS-REFERENCE TO RELATED APPLICATIONS

In this application, Applicants claim the right of priority under 35 U.S.C. § 119(a)–(d) based on patent application Ser. No. 99201677.4, filed May 27, 1999, in the European Patent Office; additionally, Applicants claim the benefit under 35 U.S.C. § 119(e) based on prior-filed, copending provisional application No. 60/136,761, filed May 28, 1999, in the U.S. Patent and Trademark Office.

BACKGROUND OF THE INVENTION

1. Field of the Invention

The present invention relates to a tire having minimized rolling resistance and to a mould for producing said type.

2. Description of the Related Art

Generally, a tire for a motor vehicle is made from a predetermined viscoelastic material and comprises at least one casing ply, right- and left-hand beads, a tread strip placed on the crown of said casing ply, and at least one belt strip interposed coaxially between said casing ply and said tread strip. The casing ply has a profile (plyline), in the plane of a meridian section, which has a central crown (or under-belt) portion and two sidewall portions, one on the right and one on the left.

The major source of energy dissipated by a tire when it rolls on a road surface consists of hysteresis losses due to the viscoelastic materials from which it is made. In particular, the energy dissipated by the various parts of a tire depends on the cyclical stresses and deformations to which it is subjected by the continual alternation of the inflated configuration (distant from the area of contact with the road or footprint) and of the flattened configuration (centre of the footprint area).

It is estimated that the hysteresis losses account for 90–95% of the total energy dispersed by a tire and that the remaining 5–10% is attributable to other dissipation mechanisms, such as the slip between the tire and the road, the aerodynamic losses due to the friction of the air, and the internal friction between the air and the tire.

Most of the energy is dissipated by the tread strip of the tire ($\geq 50\%$). This energy dissipation is essentially due to the fact that the assembly consisting of the tread strip and the belt package (belt strips) of the tire undergoes a change of curvature in both the longitudinal direction (inflection due to the passage through the footprint) and the meridian direction (flattening of the tread strip).

This energy dissipation produces the rolling resistance of the tire, and therefore the term "rolling resistance" (R.R.) will be used in the course of the present description and in the claims to denote the power dissipated in one cycle as a result of the cyclical deformations of the viscoelastic materials of the tire in neutral, in other words when it is not subject to a torque.

SUMMARY OF THE INVENTION

The object of the present invention is to reduce the power dissipation of a tire when it rolls on a road surface, and consequently to reduce its rolling resistance.

The inventors have found that the power dissipated by a tire can be reduced by minimizing the deformations undergone by the assembly consisting of the tread strip and belt package of the tire, in such a way as to contain the quantity of power dissipated in these. They have also found that a reduction in dissipation can be obtained by shifting the power dissipation of the tread strip to the area of the sidewalls, in such a way as to reduce the ratio between the quantity of power dissipated in the tread and the quantity of power dissipated in the sidewall.

The inventors have also identified a mould which enables a tire to be produced with the desired characteristics.

A first aspect of the invention is a tire for a motor vehicle, made from a predetermined viscoelastic material, and comprising a) at least one casing ply, b) a tread strip placed on the crown of said casing ply, c) at least one belt strip interposed coaxially between said casing ply and said tread strip, d) right-hand and left-hand sidewalls, and e) right-hand and left-hand beads, f) said casing ply having a profile (plyline), in the plane of a meridian section, which has a central crown (under-belt) portion and two sidewall portions, one on the right and one on the left, g) each of said sidewall profile portions being delimited by two points S and K, where the point S is located substantially at one edge of said at least one belt strip and the point K separates a sidewall from a bead, h) said tire assuming, at the operating pressure and in the absence of a load, an inflated configuration having a predetermined outer profile which matches a predetermined enclosing rectangle, i) said outer profile having a predetermined maximum chord $\overline{C}$ and a predetermined maximum height $\overline{H}$, the ratio $\overline{H}/\overline{C}$ lying in a range from 0.6 to 0.8, characterized in that, j) in said inflated configuration, said crown profile portion has a radius of meridian curvature $\rho_c$ lying in a range from 406 mm to 690 mm and each of said sidewall profile portions forms an angle $\alpha_s$ with the axis of rotation of the tire, at said point S, which lies in a range from 25° to 30°.

Preferably, each of said sidewall profile portions forms an angle $\alpha_k$ with the axis of rotation of the tire, at said point K, which is $\geq 45°$.

Advantageously, said crown profile portion is substantially flat.

In the inflated configuration, the tire according to the invention has, for given overall dimensions, extremely flat belts in the meridian plane, so that in the flattened state, when the belts pass through the footprint, their deformation in this plane is virtually zero.

Moreover, the median casing profile has a more erect (vertical) inflated configuration in the lower area of the sidewall than a conventional tire, and consequently the deformations in the upper parts of the sidewalls are greater than those in a conventional tire.

In the tire according to the invention, therefore, the power dissipation has an optimized distribution among the various parts because it is more balanced than that of a conventional tire. This makes it possible to reduce the total power dissipation and minimize the rolling resistance of the tire.

The shape of the tire in the inflated state having the structural characteristics indicated above is obtained by means of a special geometry of a mould used for forming it.

A second aspect of the invention is a mould for producing a tire made from a predetermined viscoelastic material, said mould having A) a crown formed by radially movable sectors for moulding a tread strip and shoulders of said tire, and B) cheeks for moulding sidewalls and beads of said tire, C) said mould having a profile, in the plane of the meridian section, which has a predetermined maximum chord C, a predetermined maximum height H and a fitting line I, and is formed centrally by a base profile of one sector and laterally by profiles of said cheeks, D) said base profile of the sector having a central portion flanked by two connecting portions, which in turn are flanked by two lateral portions, E) each cheek profile having a total height $H_g$ and having a first portion with a first radius of curvature $R_{fs}$ and a second portion with a second radius of curvature $R_{fi}$, characterized in that F) the ratio between said first and second radius of curvature $R_{fs}/R_{fi}$ ranges from 0.45 to 0.56.

Preferably, the ratio between said first and second radius of curvature $R_{fs}/R_{fi}$ is approximately 0.5.

Advantageously, the centres of said first and second radius of curvature $R_{fs}$ and $R_{fi}$ lie on said maximum chord C and said maximum chord C is located at a distance $H_{tc}$ from said fitting line I equal to approximately ⅔ of said height of the cheek profile $H_g$.

In one embodiment, said central portion of said base profile of the sector is substantially flat and has a radius of meridian curvature R≧500 mm, and each of said connecting portions has, at the point of junction with one of said lateral portions, an angle $\alpha_0$ with respect to the longitudinal axis of the mould which is ≧42°.

Preferably, said base profile of the sector, comprising said central portion and said flanking connecting portions, has a camber f of ≦7.5 mm.

A third aspect of the invention is a mould for producing a tire from a predetermined viscoelastic material, said mould having i. a crown formed by radially movable sectors for moulding a tread strip and shoulders of said tire, and ii. cheeks for moulding sidewalls and beads of said tire, iii. said mould having a profile, in the plane of the meridian section, which has a predetermined maximum chord C, a predetermined maximum height H and a fitting line I, and is formed centrally by a base profile of one sector and laterally by profiles of said cheeks, iv. said base profile of the sector having a central portion flanked by two connecting portions, which in turn are flanked by two lateral portions, characterized in that v. said central portion of said base profile of the sector is substantially flat and has a radius of meridian curvature R≧500 mm, and vi. each of said connecting portions has, at the point of junction with one of said lateral portions, an angle $\alpha_0$ with respect to the longitudinal axis of the mould which is ≧42°.

Preferably, said base profile of the sector, comprising said central portion and said flanking connecting portions, has a camber which has the value indicated above.

The mould according to the invention can be used to produce a tire with the desired inflated configuration, as a result of the fact that the base profile of each sector, in other words the envelope line at the base of its projections and grooves, has at its sides an angle of inclination with respect to the axis of rotation of the tire which is very small, or in any case is smaller than that of a conventional mould. The base profile of the sectors is therefore flatter and has a more open outlet than a conventional mould. In turn, the cheeks of the mould have radii of curvature $R_{fi}$ and $R_{fs}$ which have a characteristic ratio $R_{fs}/R_{fi}$ in the range from 0.45 to 0.56, and preferably ≅0.5, and their centre line is located at a height $H_{tc}$ equal to approximately ⅔ of the height of the cheek $H_g$. Additionally, the cheeks have a maximum chord C which is wider, and a width at the rim E which is greater than in a conventional mould, to prevent the beads of the tire from being moulded in a configuration which is too "inset", in other words too inclined with respect to the axis of rotation of the tire, and therefore from having a low rigidity in the inflated state.

BRIEF DESCRIPTION OF THE DRAWINGS

Characteristics and advantages of the invention will now be illustrated in greater detail with reference to an embodiment shown by way of example, without restriction, in the attached drawings, in which.

DETAILED DESCRIPTION OF THE PREFERRED EMBODIMENTS

Figure 1:
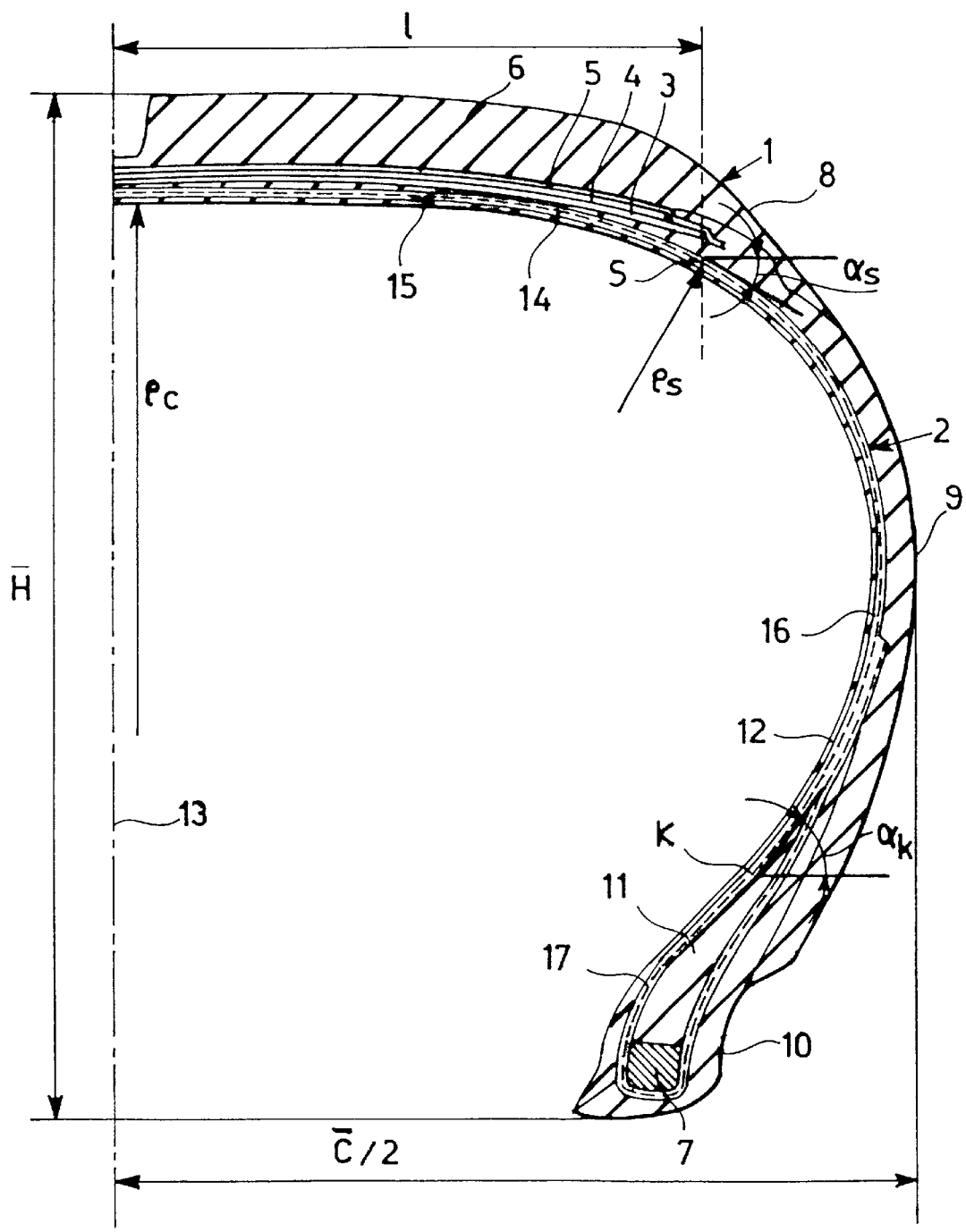
FIG. 1 is a partial sectional view, in a meridian plane, of an inflated tire, made according to the invention.

FIG. 1 shows a tire 1 according to the invention in the inflated configuration, in the absence of a load. The tire 1 is classed as 195/65 R 15 and is of the radial type. The tire 1 comprises a casing 2, belt strips 3, 4 and 5, a tread strip 6 and bead cores 7. FIG. 1 shows a shoulder 8, a sidewall 9, a bead 10 and a bead filler 11, which are located to the right of an equatorial plane 13. Those located to the left of the equatorial plane 13 are not shown, because the tire 1 is symmetrical about this plane. The tire 1 has an air-tight inner layer (liner) 12. The casing 2 is formed from a rubberized fabric ply, reinforced with textile cords lying in meridian (radial) planes and wrapped around bead cores 7.

The belt strips 3, 4 and 5 and the tread strip 6 are placed on the crown of the casing 2 and extend circumferentially around it. The belt strips 3 and 4 are formed from rubberized fabric plies, reinforced with corresponding metal cords, crossing each other symmetrically with respect to the equatorial plane 13. The belt strip 5, placed on top of the belt strips 3 and 4, is formed from a rubberized fabric ply, reinforced with textile cords, orientated circumferentially (0° belt). The tread strip 6 is provided with projections, blocks and grooves (not shown) which, during operation, come into contact with a road surface.

The outer profile of the tire 1 has a maximum chord $\overline{C}$ of 200.8 mm and a maximum height $\overline{H}$ of 128.1 mm. The ratio $\overline{H}/\overline{C}$ is 0.63 and lies in a range from 0.6 to 0.8.

The casing ply 2 of the tire 1 has a meridian profile (plyline) 14, represented by a broken line, comprising a central crown portion (under-belt) 15 and two sidewall portions 16, one on the right and one on the left. FIG. 1 shows only half of the crown portion 15 and the sidewall portion 16 which are located to the right of the equatorial plane 13. Those located to the left are mirror images. Each sidewall portion 16 is delimited by two terminal points, S and K. The point S is located at one edge of the belt package 3, 4 and 5, and forms the point of separation between the crown portion 15 and the sidewall portion 16. The point K forms the point of separation between the sidewall portion 16 and a bead portion 17. The crown portion 15 of the meridian profile 14 has a radius of curvature $\rho_c$. The sidewall profile 16 forms an angle $\alpha_s$ with the axis of rotation of the tire at the point S, and forms an angle $\alpha_k$ with the axis of rotation of the tire at the point K. The tread 6 has a width 1.

In the tire 1, the angle $\alpha_s$ advantageously ranges from 25° to 30° as the radius of curvature $\rho_c$ varies in a range from 406 mm to 690 mm.

The angle $\alpha_k$ lies in a range from 45° to 50°.

In particular, in the tire 1 the radius of curvature $\rho_c$=689.8 mm; the angle $\alpha_s$=29.6°; the angle $\alpha_k$=45.8°; and the width 1=74.6 mm.

In the tire 1, the variations of curvature between the inflated and flattened states of the belt package 3, 4 and 5 and the tread strip 6 are minimized by making these have an extremely flat shape in the inflated configuration.

This is demonstrated by the formula discovered by the inventors, which relates the variation of equatorial curvature ΔC due to the passage through the footprint to the characteristic parameters of the tire:

$$\Delta C = K_r * s/(T/p) = K_r * s/(1 - 2 * \rho_s * \alpha_s) = K_r * s/(1 * (1 - \rho_s/\rho_c))$$

where $\rho_c$, $\alpha_s$ and $\alpha_k$ represent the parameters indicated above;

$\rho_s$=radius of meridian curvature in the area of the point S;
$K_r$=radial rigidity of the sidewall;
s=flattening;
T=total pull on the belt package in the circumferential direction;
p=air pressure inside the tire.

From the above relation it may be seen that ΔC decreases with a decrease in $\alpha_s$ and with a decrease in the ratio $\rho_s/\rho_c$, in other words with an increase in $\rho_c$.

In the tire 1, the radius of curvature $\rho_c$ has a much higher value than in a conventional tire, as will be illustrated in greater detail below. The meridian profile 14 of the tire 1 therefore has a smaller ratio $\rho_s/\rho_c$. Additionally, the lower area of the sidewall 16 has a more upright shape than that of a conventional tire. When the tire is flattened, this shape of the sidewall tends to cause the deformations due to the meridian inflection to be concentrated in the area of the sidewall lying between the maximum chord and the edge of the belt package.

The configuration adopted for the meridian profile meets the conditions of the enclosing rectangle in the inflated state and enables the casing profile to be joined to the bead filler while avoiding points of discontinuity in the sidewall portion of said profile.

Figure 2:
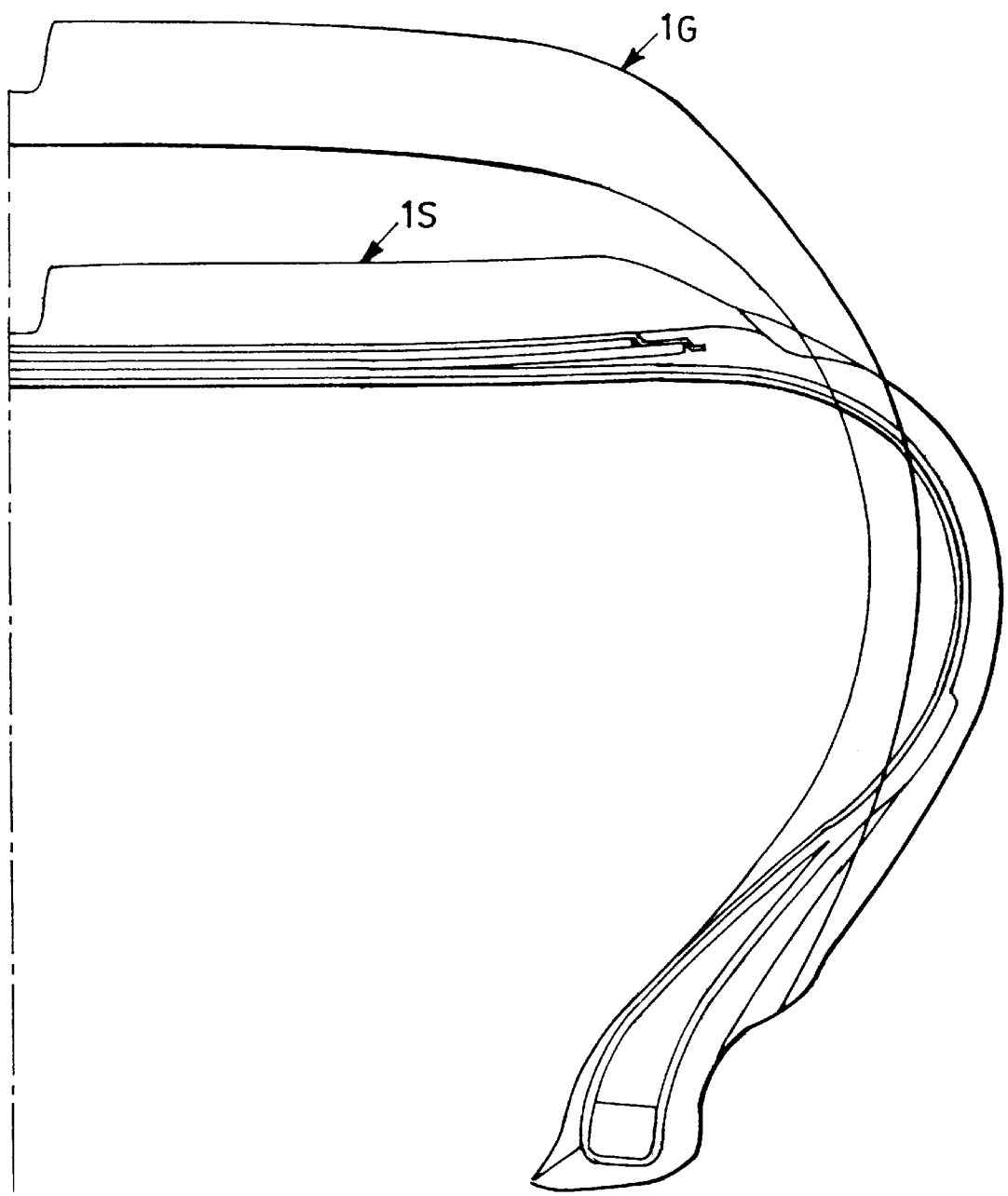
FIG. 2 shows the tire of FIG. 1 in the inflated and flattened configurations.

FIG. 2 shows the tire 1 in the inflated configuration 1G, with an operating pressure p=2.2 bar, and in the flattened configuration 1S, under a load Q=493 kg.

Figure 3:
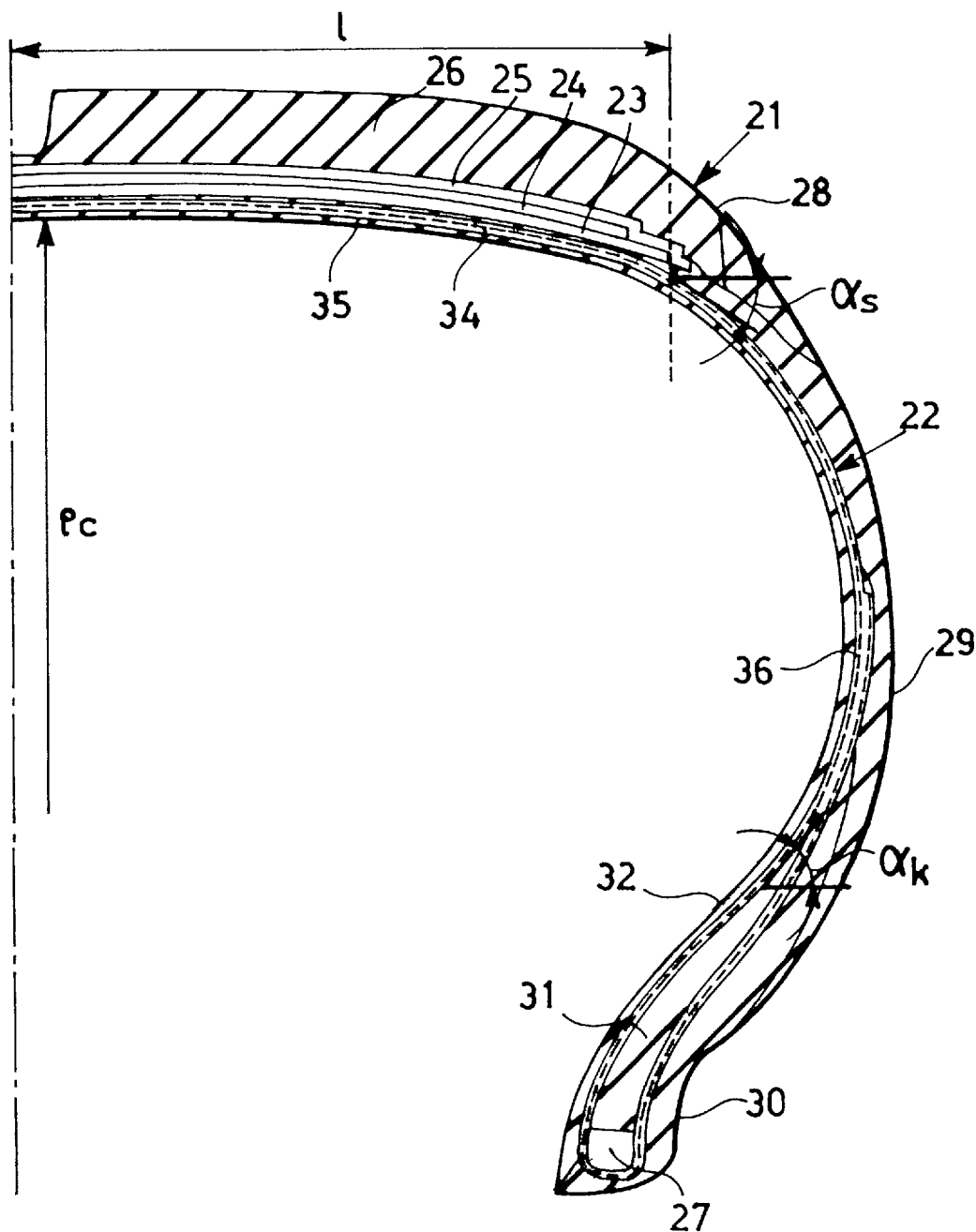
FIG. 3 is a partial sectional view, in a meridian plane, of a conventional inflated tire.

FIG. 3 shows a conventional tire 21, having the classification 195/65 R 15 and identified by the symbol NP6.

The tire 21 comprises a casing 22 formed by a ply folded around bead cores 27, belt strips 23, 24 and 25, and a tread strip 26. A shoulder 28, a sidewall 29, a bead 30 and a bead filler 31 of the tire 21 are shown. An air-tight inner layer 32 is also shown.

The casing ply 2 of the tire 21 has a meridian profile (plyline) 34 comprising a central crown portion (under-belt) 35 and two sidewall portions 36, one on the right and one on the left.

The tire 21 has a radius of curvature $\rho_c$=357.1 mm; angle $\alpha_s$=31.4°; angle $\alpha_k$=42.2°; and width 1=75.8 mm.

When FIG. 1 is compared with FIG. 3, it is clear that the belt package 3, 4 and 5 and the tread strip 6 of the tire 1 have a flatter shape than the belt package 23, 24 and 25 and the tread strip 26 of the tire 21 so that their deformation in the meridian plane is smaller when they pass through the footprint.

Figure 4:
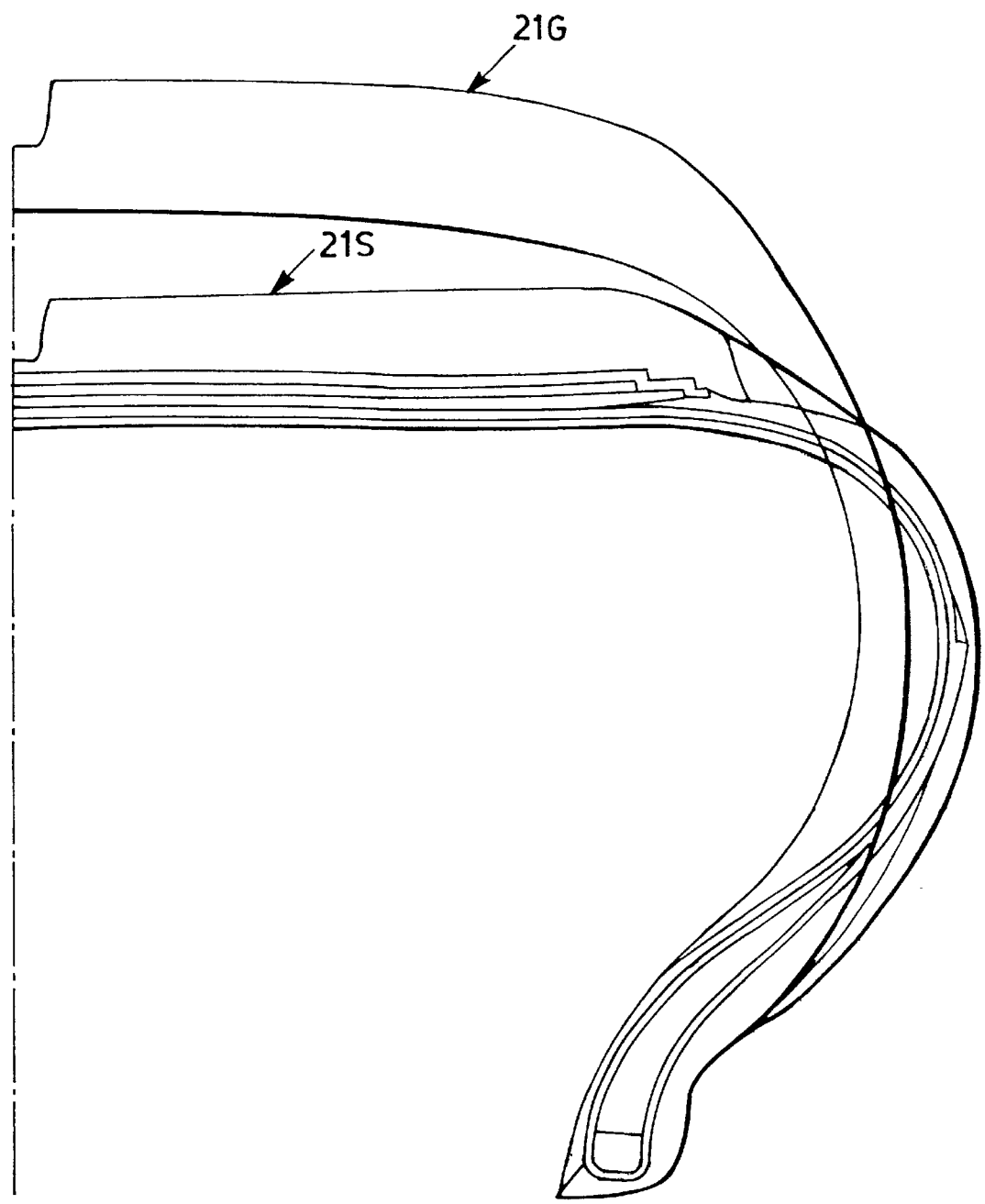
FIG. 4 shows the tire of FIG. 3 in the inflated and flattened configurations.

FIG. 4 shows the tire 21 in the inflated configuration 21G, with an operating pressure p=2.2 bar, and in the flattened configuration 21S, under a load Q=493 kg.

When FIG. 4 is compared with FIG. 2 it may be noted that the upper mid-point of the sidewall 9 of the tire 1 (near the tread strip 6) is more markedly deformed in the flattened state than the lower mid-point of the sidewall (near the bead 10), while the upper and lower areas of the sidewall 29 of the tire 21 are deformed in a more uniform way in the flattened state.

Figure 5:
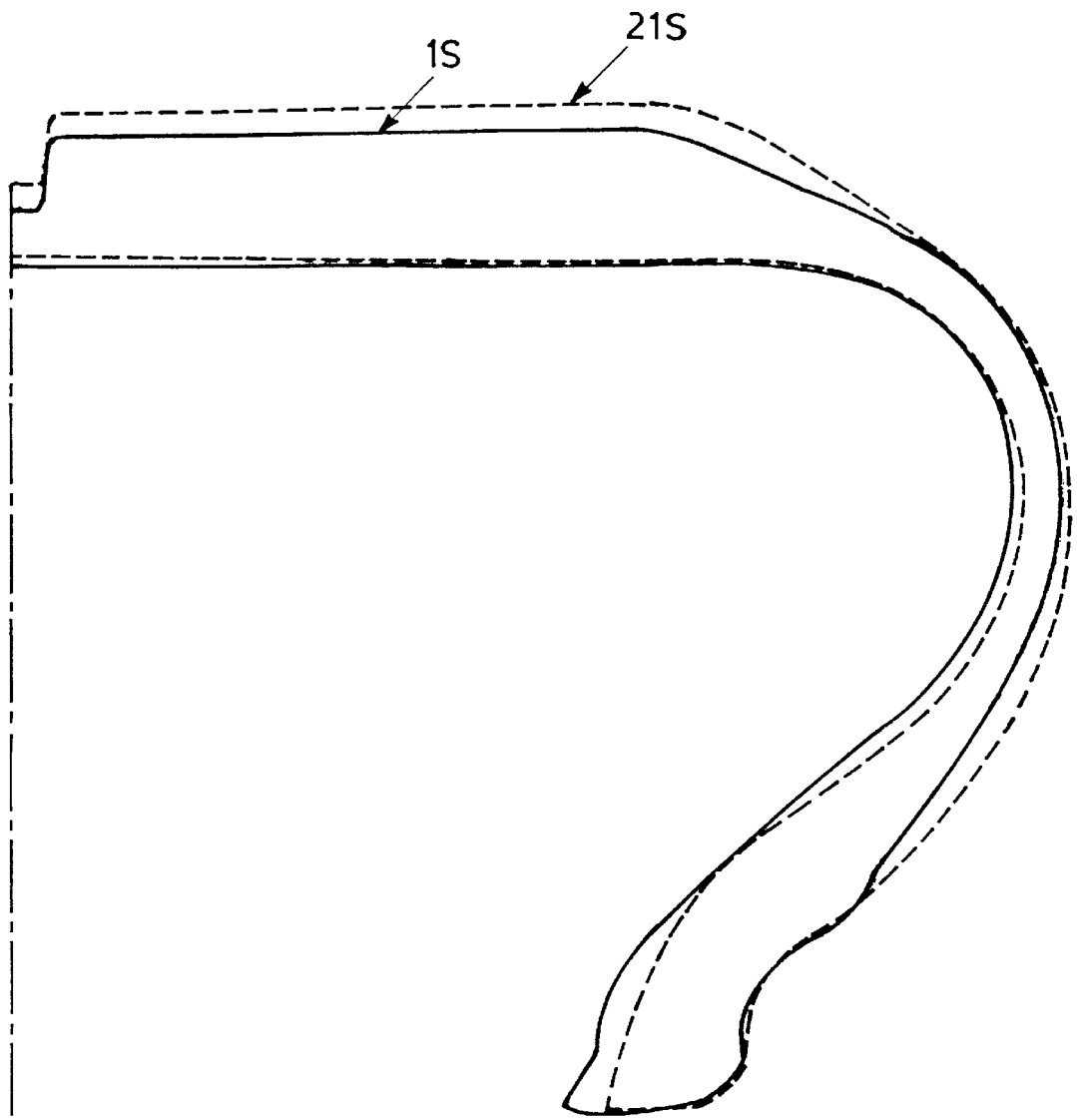
FIG. 5 shows for the purpose of comparison the flattened configurations of the tire according to the invention shown in FIGS. 1 and 2 and of the conventional tire shown in FIGS. 3 and 4.

In FIG. 5, the flattened configuration 1S of the tire 1 according to the invention and the flattened configurations 21S of the conventional tire 21, found with the same load of 493 kg, are compared.

Figure 6:
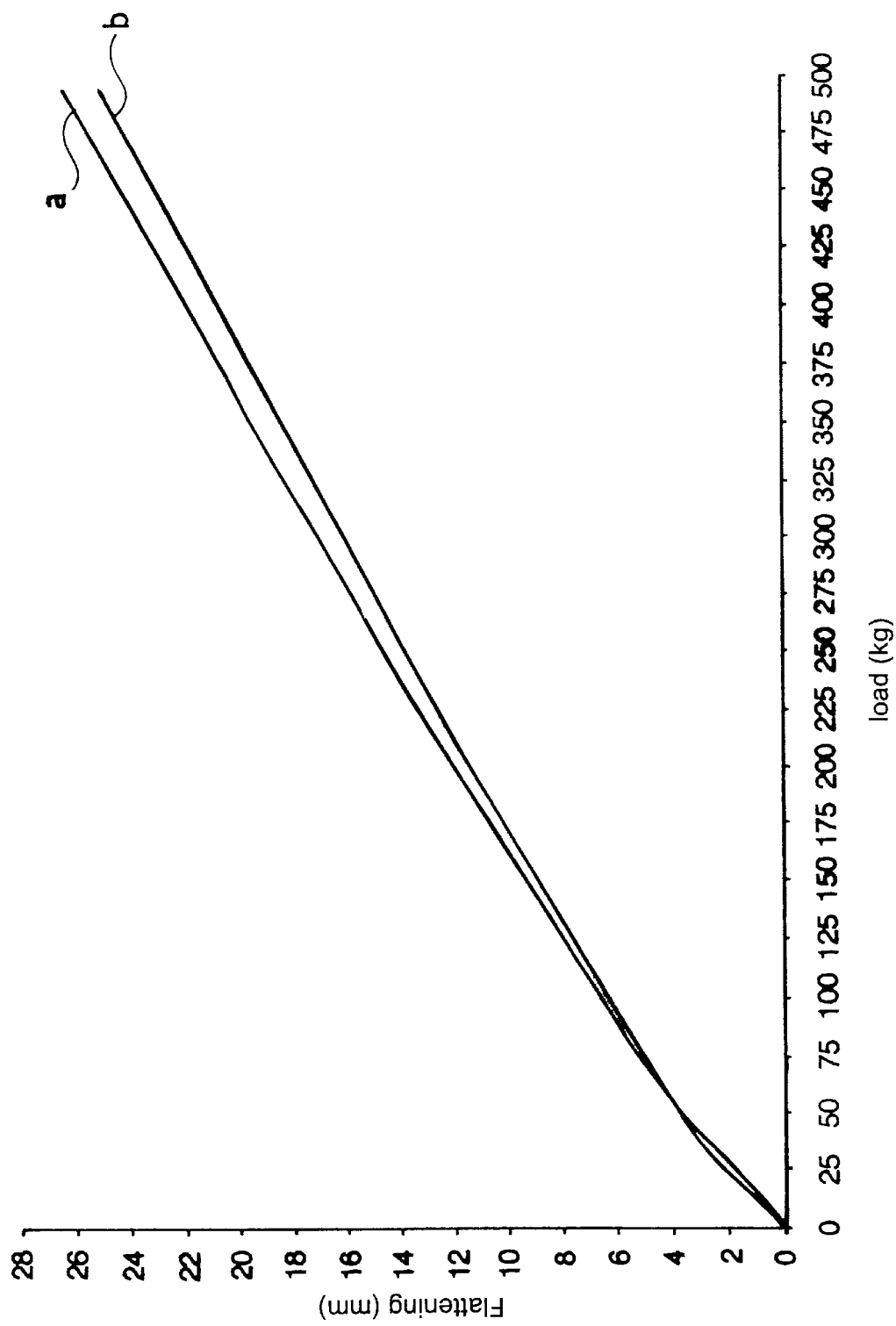
FIG. 6 is a graph showing how the flattening of the tire of FIGS. 1 and 2 and that of FIGS. 3 and 4 varies as the load on the tire varies.

The graph in FIG. 6 shows the variation in the flattening with a variation in the load for the tire 1 (line a) and for the tire 21 (line b). The tire 1 is found to undergo a greater flattening than the tire 21 for the same load. This is due to the fact that the upper area of the sidewall is more deformable than that of the tire 21.

Two tires having mixtures with the following characteristics were used to evaluate the rolling resistance of the tire 1 with respect to the tire 21:

| Material | Elastic modulus E' (N/mm$^2$) | tan δ (Loss factor) |
| --- | --- | --- |
| Tread | 6.975 | 0.1486 |
| Sidewall | 3.768 | 0.0856 |
| Abrasion-resistant material | 9.7 | 0.217 |
| Bead filler | 57.35 | 0.204 |
| Liner | 3.318 | 0.269 |
| Casing | 3.925 | 0.09596 |
| Belts | 9.234 | 0.108 |
| Zero-degree belts | 6.42 | 0.1025 |

Tests were carried out with a vertical load of 493 kg, a speed of 100 km/hr and a mixture temperature of 70° C.

The following values were found for the tire 1:

| Tyre 1 | Area | Power dissipated | Proportion of total | Ratio |
| --- | --- | --- | --- | --- |
| R.R. = 5.93926 (thou.) | Tread | 409818.28 | 51.4 | 4.3 |
|  | Sidewall | 94287.94 | 11.8 |  |

R.R. indicates the coefficient of rolling resistance, expressed in thousandths of the value of the ratio between the vertical load applied to the tire and the tractive force required to move the tire. The power dissipated is expressed in N*mm/s. The "Ratio" column shows the ratio between the power dissipated in the tread mixture and the power dissipated in the sidewall mixture.

The following values were found for the comparative Tyre 21:

| Tyre 21 | Area | Power dissipated | Proportion of total | Ratio |
|---|---|---|---|---|
| R.R. = 6.24967 (thou.) | Tread | 425859.08 | 50.7 | 7.0 |
| | Sidewall | 61035.40 | 7.3 | |

It is found that the ratio between the power dissipated in the tread mixture and the power dissipated in the sidewall mixture is smaller in the tire 1 than in the tire 21. The tire 1 therefore has a power dissipation distribution which is more balanced between its parts than that of the tire 21.

Figure 7:
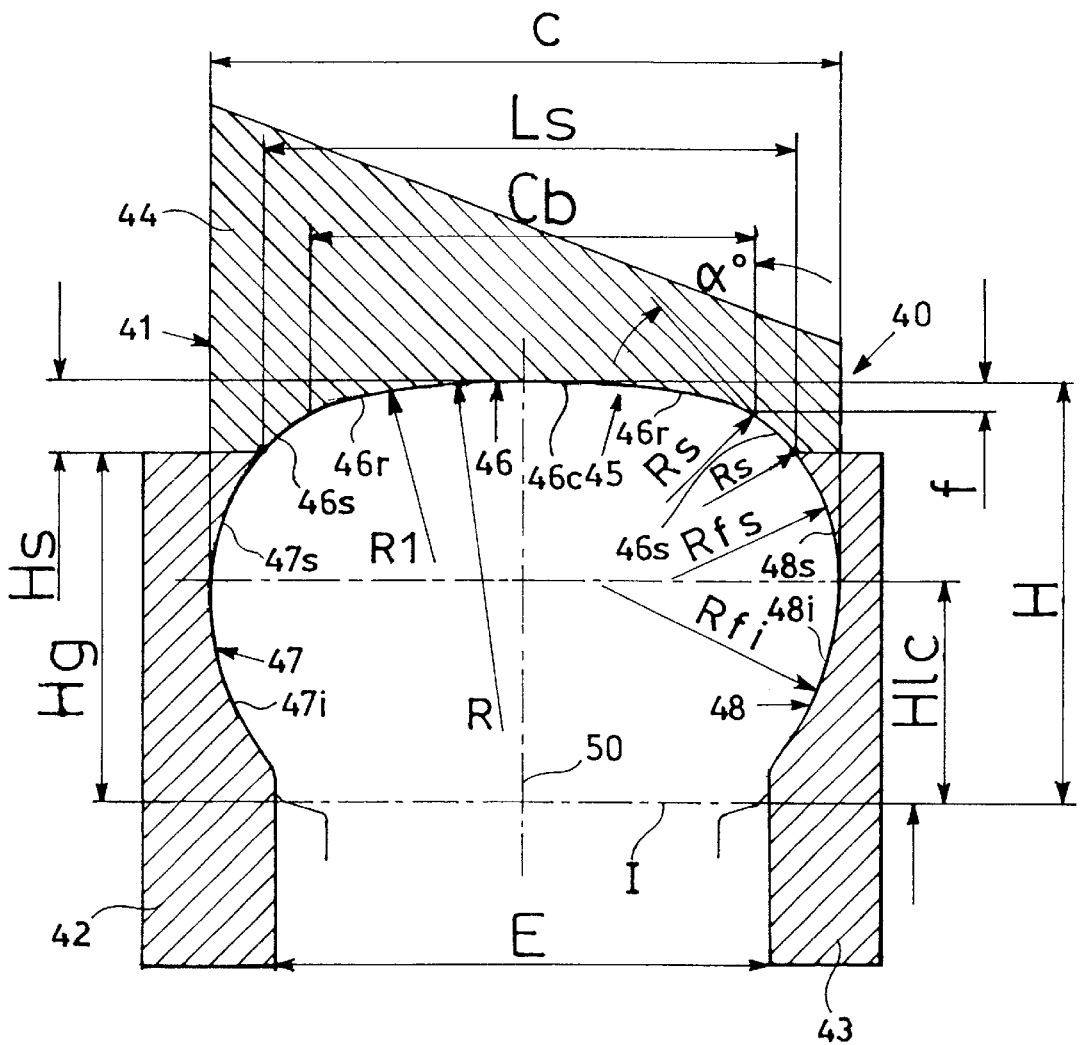
FIG. 7 is a partial sectional view, in a meridian plane, of a mould for forming the tire of, FIG. 1.

FIG. 7 shows a vulcanization mould 40 of the centripetal type, suitable for tire production. The mould 40 comprises a central crown 41, formed by a plurality of radially movable sectors 44, for moulding the pattern of the tread strip and the shoulders of the tire. The projections and grooves of the sectors 44 are not shown. The mould 40 also comprises two cheeks 42 and 43 which are mirror images of each other and are axially opposed, for moulding the sidewalls and beads of the tire, and an inner bladder, not shown, which can be inflated by means of a pressurized fluid. The sectors 44 are moved radially in both directions (centripetal and centrifugal), perpendicularly to the longitudinal axis of the mould, by an operating ring which is not shown. The cheeks 42 and 43 are movable axially and reciprocally with respect to each other.

In the plane of the meridian section, the mould 40 has an inner profile 45, formed centrally by a base profile 46 of a sector and laterally by two profiles 47 and 48 of the cheeks. The base profile 46 has a central portion 46c flanked by two connecting portions 46r which in turn are flanked by two shoulder portions 46s. Each of the cheek profiles 47 and 48 is formed by two portions, 47s, 47i and 48s, 48i respectively.

FIG. 7 shows the following dimensional parameters of the mould 40: C=chord of tire; $L_S$=width of sectors; $C_b$=chord of tread; R=radius of tread on crown; $R_j$=radius of crown-shoulder joint; $R_S$=radius of shoulder; $\alpha°$ angle of shoulder with respect to a longitudinal axis 50; $R_{fs}$=radius of upper sidewall; $R_{fi}$=radius of lower sidewall; f=camber of tread; $H_s$=height of sectors; H=height of section; $H_g$=height of cheeks; $H_{lc}$=height of maximum chord point; E=width of mould rim.

In the mould 40, the angle $\alpha°$ lies in a range from 42° to 43°, and the radius of meridian curvature R lies in a range from 500 mm to 619 mm. In turn, the radii of curvature $R_{fs}$ and $R_{fi}$ of the portions 47s, 47i and 48s, 48i of the cheek profiles have a ratio $R_{fs}/R_{fi}$ equal to approximately 0.5 and the centres of the radii of curvature $R_{fs}$ and $R_{fi}$ are located at a height $H_{lc}$ which is equal to approximately 2/3 of the height of the cheek $H_g$.

In particular, the mould 40 for producing the tire 1 has the following dimensions:

C=209.4 mm; $L_s$=183.0 mm; $C_b$=142.6 mm; R=619.0 mm; $R_j$=129.0 mm; $R_s$=30.0 mm; $\alpha°$=42.6°; $R_{fs}$=47.4 mm; $R_{fi}$=105.0 mm; f=7.5 mm; $H_s$=29.5 mm; H=127.75 mm; $H_g$=98.25 mm; $H_{lc}$=65.46 mm; E=174.0 mm.

What is claimed is:

1. Mould for producing a tire made from a predetermined viscoelastic material, said mould having
   A) a crown formed by radially movable sectors for moulding a tread strip and shoulders of said tire, and
   B) cheeks for moulding sidewalls and beads of said tire,
   C) said mould having a profile, in the plane of the meridian section, which has a predetermined maximum chord C, a predetermined maximum height H and a fitting line I, and is formed centrally by a base profile of one sector and laterally by profiles of said cheeks,
   D) said base profile of the sector having a central portion flanked by two connecting portions, which in turn are flanked by two lateral portions,
   E) each cheek profile having a total height $H_g$ and having a first portion with a first radius of curvature $R_{fs}$ and a second portion with a second radius of curvature $R_{fi}$, characterized in that
   F) the ratio between said first and second radius of curvature $R_{fs}/R_{fi}$ ranges from 0.45 to 0.56.

2. Mould according to claim 1, characterized in that the ratio between said first and second radius of curvature $R_{fs}/R_{fi}$ is approximately 0.5.

3. Mould according to claim 1, characterized in that the centres of said first and second radius of curvature $R_{fs}$ and $R_{fi}$ lie on said maximum chord C and in that said maximum chord C is located at a distance $H_{lc}$ from said fitting line I equal to approximately 2/3 of said height of the cheek profile $H_g$.

4. Mould according to claim 1, characterized in that said central portion of said base profile of the sector is approximately flat and has a radius of meridian curvature R≧500 mm, and each of said connecting portions has, at the point of junction with one of said lateral portions, an angle $\alpha_0$ with respect to the longitudinal axis of the mould which is ≧42°.

5. Mould according to claim 1, characterized in that said base profile of the sector, comprising said central portion and said flanking connecting portions, has a camber f of ≦7.5 mm.

6. A mould for producing a tire, comprising:
   a crown; and
   at least two cheeks;
   wherein the crown comprises radially-movable sectors,
   wherein a first cheek is axially opposite a second cheek,
   wherein the mould comprises a main profile in a plane of a meridian section,
   wherein the main profile comprises a maximum chord,
   wherein the main profile comprises a maximum height measured from a fitting line,
   wherein the main profile comprises a profile of the first cheek, a base profile of a sector, and a profile of the second cheek,
   wherein the base profile comprises a first lateral portion, a first connecting portion, a central portion, a second connecting portion, and a second lateral portion,
   wherein the first lateral portion is axially opposite the second lateral portion,
   wherein the first connecting portion is axially opposite the second connecting portion,
   wherein each cheek profile comprises a total height measured from the fitting line,
   wherein each cheek profile comprises a first portion comprising a first radius of curvature,
   wherein each cheek profile comprises a second portion comprising a second radius of curvature, and
   wherein, for each cheek profile, a ratio of the first radius of curvature to the second radius of curvature is greater than or equal to 0.45:1 and less than or equal to 0.56:1.

7. The mould of claim 6, wherein the ratio is approximately 0.5:1.

8. The mould of claim 6, wherein, for each cheek, a center of the first radius of curvature lies on a line segment defined by the maximum chord, and wherein, for each cheek, a center of the second radius of curvature lies on the line segment defined by the maximum chord.

9. The mould of claim 6, wherein, for each main profile, the maximum chord comprises a distance measured from the fitting line, and wherein a ratio of the distance to the total height of a corresponding cheek profile is approximately 2:3.

10. The mould of claim 6, wherein the central portion is approximately flat, and wherein each connecting portion comprises, at a junction point with a corresponding lateral portion, an angle with respect to a radial direction of the mould greater than or equal to 42°.

11. The mould of claim 10, wherein the angle is less than or equal to 43°.

12. The mould of claim 6, wherein the central portion comprises a radius of meridian curvature greater than or equal to 500 mm, and wherein each connecting portion comprises, at a junction point with a corresponding lateral portion, an angle with respect to a radial direction of the mould greater than or equal to 42°.

13. The mould of claim 12, wherein the radius of meridian curvature is less than or equal to 619 mm.

14. The mould of claim 12, wherein the angle is less than or equal to 43°.

15. The mould of claim 6, wherein a section of the base profile comprising the first connecting portion, the central portion, and the second connecting portion comprises a camber less than or equal to 7.5 mm.

16. A mould for producing a tire, comprising:

a crown;

a first cheek; and a second cheek;

wherein the crown comprises radially-movable sectors, wherein the first cheek is axially opposite the second cheek, wherein the mould comprises a main profile in a plane of a meridian section, wherein the main profile comprises a maximum chord, wherein the main profile comprises a maximum height measured from a fitting line, wherein the main profile comprises a profile of the first cheek, a base profile of a sector, and a profile of the second cheek, wherein the base profile comprises a first lateral portion, a first connecting portion, a central portion, a second connecting portion, and a second lateral portion, wherein the first lateral portion is axially opposite the second lateral portion, wherein the first connecting portion is axially opposite the second connecting portion, wherein each cheek profile comprises a total height measured from the fitting line, wherein each cheek profile comprises a first portion comprising a first radius of curvature, wherein each cheek profile comprises a second portion comprising a second radius of curvature, and wherein, for each cheek profile, a ratio of the first radius of curvature to the second radius of curvature is greater than or equal to 0.45:1 and less than or equal to 0.56:1.

17. The mould of claim 16, wherein the first check is a mirror image of the second cheek.

18. The mould of claim 16, wherein the first check is movable axially and reciprocally with respect to the second cheek.

19. The mould of claim 16, wherein the ratio is approximately 0.5:1.

20. The mould of claim 16, wherein, for each cheek, a center of the first radius of curvature lies on a line segment defined by the maximum chord, and wherein, for each cheek, a center of the second radius of curvature lies on the line segment defined by the maximum chord.

21. The mould of claim 16, wherein, for each main profile, the maximum chord comprises a distance measured from the fitting line, and wherein a ratio of the distance to the total height of a corresponding cheek profile is approximately 2:3.

22. The mould of claim 16, wherein the central portion is approximately flat, and wherein each connecting portion comprises, at a junction point with a corresponding lateral portion, an angle with respect to a radial direction of the mould greater than or equal to 42°.

23. The mould of claim 22, wherein the angle is less than or equal to 43°.

24. The mould of claim 16, wherein the central portion comprises a radius of meridian curvature greater than or equal to 500 mm, and wherein each connecting portion comprises, at a junction point with a corresponding lateral portion, an angle with respect to a radial direction of the mould greater than or equal to 42°.

25. The mould of claim 24, wherein the radius of meridian curvature is less than or equal to 619 mm.

26. The mould of claim 24, wherein the angle is less than or equal to 43°.

27. The mould of claim 16, wherein a section of the base profile comprising the first connecting portion, the central portion, and the second connecting portion comprises a camber less than or equal to 7.5 mm.

* * * * *